2 Sheets--Sheet 1.

J. C. WANDS.

Car Roofs.

No. 5,515. Reissued July 29, 1873.

*Witnesses.*

E. A. Bates.

George E. Upham.

*Inventor.*

John C. Wands

Chipman & Osmun & Co

Attys

2 Sheets--Sheet 2

J. C. WANDS.

Car Roofs.

No. 5,515. Reissued July 29, 1873.

Witnesses.
E. N. Bates.
George E. Upham.

Inventor
John C. Wands,
Chipman & Souther & Co
attys

UNITED STATES PATENT OFFICE.

JOHN C. WANDS, OF NASHVILLE, TENNESSEE.

IMPROVEMENT IN CAR-ROOFS.

Specification forming part of Letters Patent No. 136,569, dated March 4, 1873; reissue No. 5,515, dated July 29, 1873; application filed May 3, 1873.

*To all whom it may concern:*

Be it known that I, J. C. WANDS, of Nashville, in the county of Davidson and State of Tennessee, have invented a new and valuable Improvement in Car-Roofs; and I do hereby declare that the following is a full, clear, and exact description of the construction and operation of the same, reference being had to the annexed drawing making a part of this specification, and to the letters and figures of reference marked thereon.

Figure 1:
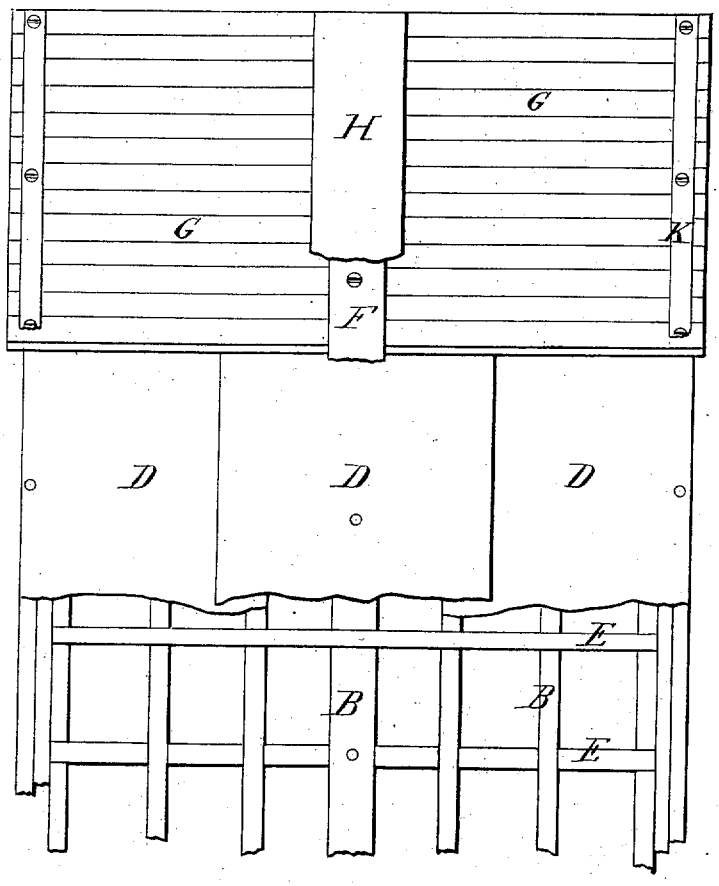
Figure 2:
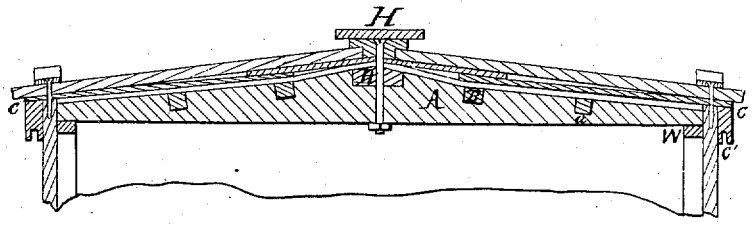
Figure 3:
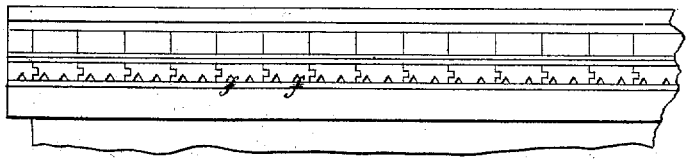
Figure 4:
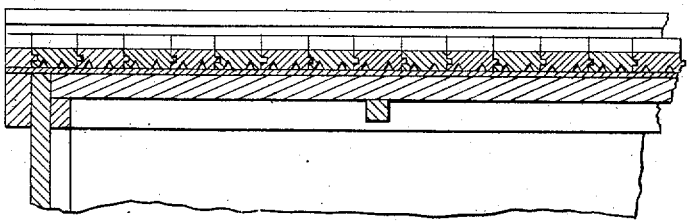
Figure 5:
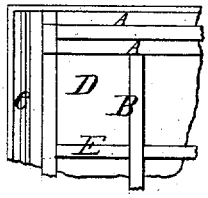

Figure 1 of the drawings is a representation of a plan view of my car-roof. Figs. 2, 3, and 4 are cross-sections of the same. Fig. 5 is a detail view.

My invention has relation to railway cars; and consists in the novel construction of a roof for such cars, as hereinafter described, which is intended to serve as a valuable improvement, by lessening the ordinary weight of such roofs without detracting from the strength and durability thereof.

A of the drawing represents the rafters of my car-roof, which are placed at each end in suitable mortises formed in the wall-plates W. These rafters are constructed with a view to sustaining an angular roof, and for that purpose are made with angular upper surfaces, as shown on Fig. 1. They are also mortised or grooved, as shown at *a*, to receive the purline-plates, hereinafter described. B represents my purline-plates or string-pieces, which extend from end to end of the car resting in the rafters, as shown. The letters C represent frieze-boards bolted or screwed to the rafters A at each end of the car, for which purpose the end rafters are made longer than the others. The sides and ends of the car, at their tops are secured between the wall-plates W, the frieze-boards C, and two rafters arranged at each end of the roof so nearly together that a space is left between them barely sufficient to receive the tops of the end walls of the car. I form a groove in the lower edge of my frieze-board, as shown at *c*, to provide for diverting water from the joints and car sides that falls from the roof. Suitable screws, bolts, or spikes are passed through the frieze-boards, the side walls of the car, and the wall-plates W, connecting them all firmly together. Screws are preferable for this use, as they serve to make the united parts removable at will. The letters E indicate bands of hoop-iron stretched across the tops of the purlines B at right angles therewith, and secured to the wall-plates W. These bands serve to support the metal roofing, hereinafter described. The letter D indicates a covering of zinc or other suitable sheet metal. This covering is formed of three sheets stretched longitudinally with the car and upon the frame above described; or they may, if preferable, be placed upon a lining of boards. Each of these sheets is of a width corresponding to a little more than a third part of the width of the roof, to provide for the lap and projection next mentioned. The central sheet is bent over the crown of the roof upon the wide and beveled central purline B, and laps over each of the other sheets, as shown on Fig. 1. The two outer sheets project a short distance outward beyond the frieze-boards, to form eaves for the roof. The ends of these sheets are secured by bands or locks, such as are ordinarily used in the manufacture of tin or zinc ware. The letter F indicates what I call the central or top purline. It is constructed with a grooved or beveled bottom, adapted to fit upon the bent crown of the central sheet of metal, and has side grooves *y* adapted to receive the upper ends of the roof-boards. It will readily be seen that this purline is adapted for use either upon a metal or wooden roof. This plate is screwed to the central purline B through the bent or central sheet of metal, and thereby made removable. The letter H represents the running-board for the use of brakemen, and upon which it is intended that they shall pass from end to end of the cars. It is fastened to the top of the purline F by any suitable means; but screws are preferable for that purpose, as they will render it removable. The letters G represent my roof-boards, which are preferably tongued and grooved together. The upper ends of these boards are secured in the side grooves *y* of the central purline F, while their lower ends are secured to the frieze-boards C by screws or nails, which screws or nails also hold in position the longitudinal bands K. I form grooves in the bottoms of these boards, respectively, which extend from end to end, and serve to carry off any water that may reach the metal covering through the joints of the boards. These grooves are marked *f* on the drawing. The bands E and K may be sometimes dispensed with.

I am aware that sheets of zinc have been used in the construction of car-roofs upon wooden frames. I do not therefore claim the use thereof broadly. I am aware that in house-roofs a central rectangular beam without flanges has been used against which the upper ends of the roof-boards abut on each side, and that a cap has been placed upon said beam and held in place and made removable by means of hooks and staples; I lay no claim to the invention of such beam or cap; but

What I claim as my invention, and desire to secure by Letters Patent, is—

1. The car-roof herein described, having the wooden frame consisting of the parts A B C W, the bands E and K, the zinc sheets D, and grooved roof-boards G, the several parts being constructed and arranged substantially as and for the purpose specified.

In a car-roof, the central T-shaped purline F, having a depressed body and covering flanges, substantially as and for the purpose specified.

3. The combination of the purline F, roof-boards G, and frieze-boards C, constructed and arranged in a car-roof, substantially as described.

4. In a car-roof, the boards C *c*, having grooves *f* on their under sides to form drains for leakage, substantially as and for the purpose specified.

In testimony that I claim the above I have hereunto subscribed my name in the presence of two witnesses.

JOHN C. WANDS.

Witnesses:
JOHN L. BURNHAM,
M. MAHONEY.